United States Patent Office 3,328,376
Patented June 27, 1967

3,328,376
PROCESS FOR THE PRODUCTION OF
POLYBUTADIENE
Paul Bernemann, Haltern, and Frederico Engel and Johannes Schafer, Marl, Germany, assignors to Chemische Werke Huls Aktiengesellschaft, Recklinghausen, Germany, a corporation of Germany
No Drawing. Filed Sept. 23, 1964, Ser. No. 398,773
Claims priority, application Germany, Oct. 17, 1963,
C 31,166
1 Claim. (Cl. 260—94.3)

It is known that butadiene-1,3 can be polymerized with a metalloorganic mixed catalyst to a rubber-like product in which the double bonds are predominately in the 1,4-cis configuration.

As is known the metalloorganic mixed catalysts contain compounds of metals of group VIII of the periodic system of Mendeléeff e.g. iron, cobalt and nickel salts of organic and inorganic acids as well as complex compounds of these metals such as cobalt acetylacetonate and metalloorganic compounds of metals of groups II and III of said periodic system such as aluminium trialkyls, dialkylaluminium monohalides and alkylaluminium sesquichloride. The aliphatic and aromatic hydrocarbons and mixtures thereof may be used as solvents. The polybutadiene remains in solution and increases the viscosity of the reaction mixture as the reaction increases. The viscosity increase is dependent upon the concentration and the molecular weight of the dissolved polymer. As the viscosity increases it becomes more difficult to remove the heat liberated by the polymerization and the stirring. For this reason the polymerization concentration normally is held at a value within the range from 5 to 20%. So it has been proposed already to add to the polymerization mixture prior to catalyst deactivation arylazo and hydrazo compounds in order to increase the molecular weight of such polymer.

It has now been found that 1,4-cis polybutadiene advantageously can be made by the polymerization of butadiene-1,3 in organic solvents in the presence of mixed catalysts consisting of compounds of metals of Group VIII of the periodic system and halogen-containing metalloorganic compounds of metals of Groups II and III of the periodic system if from 0.001 to 1 mol of an active hydrogen containing compound, calculated upon the metalorganic catalyst component, is added to the polymerization mixture, prior to catalyst deactivation, allowing the molecular weight of the polymers to increase and isolating the polymers from the reaction mixture.

The addition of the compound containing active hydrogen after the polymerization results in a sharp increase in the molecular weight and the Mooney viscosity of the polybutadiene. It is therefore possible to hold the viscosity of the solution within the desired low range during the polymerization or to increase the polymer concentration while maintaining the viscosity of the solution constant.

Suitable mixed catalysts, as is well known, contain compounds of the metals of Group VIII of the periodic system such as iron, cobalt, nickel, ruthenium, thorium, palladium, osmium, iridium and platinum in amounts from 0.00001 mmol to 1000 mmol, preferably from 0.001 mmol to 0.1 mmol per liter of the combined volumes of solvent and butadiene and more than 0.1 mmol per liter of halogen containing metalloorganic compound of metals of Groups II and III of the periodic system such as calciumethylchloride, calciumethylbromide, calciumethyliodide, dialkylaluminiummonohalides, diarylaluminiummonohalides and aralkylaluminiummonohalides such as diethylaluminium monochloride and diethylaluminium bromide and monoalkylaluminiumdihalides and monoarylaluminiumdihalides such as monoethylaluminiumdichloride and monoethylaluminiumdibromide and also alkylaluminiumsesquihalides. By using dialkylaluminiumhalides, e.g., diethylaluminiumchloride, in the reaction mixture water must be present in an amount of 0.01 to 1 mol, calculated upon 1 mol of dialkylaluminiumhalide.

Suitable compounds that contain active hydrogen are e.g. water, alcohols, mercaptans, inorganic and organic acids, phenols, thiophenols, enolizable carbonyl compounds and imides.

Useful alcohols are methanol, ethanol, isopropanol, t-butanol, benzylalcohol, triphenylcarbinol, naphthylethylcarbinol, glycol, propylenglycol, nonanediol, glycerin, alIylalcohol, 2-butinediol-1,3, ethanolamine, diethanolamine, triethanolamine, trichloroethanol. Useful mercaptans are e.g. methyl and ethylmercaptans and their homologues.

Suitable inorganic acids are nitric-, nitrosic-, sulfuric-, sulfurosic-, phosphoric-, phosphorosic-, perchloric- and trinitric-hydrogen-acids.

Organic acids are formic acid, acetic acid, propionic acid, stearic acid, oleic acid, trichloroacetic acid, linoleic acid, propargylic acid, phenylacetic acid, naphthalic acid, cinnamon acid, adipidic acid, azelaic acid, phthalic acid, acetylene dicarboxylic acid, tricarballylic acid, methacrylic acid, crotonic acid, vinylacetic acid, lactic acid, citric acid, aminoacetic acid, amino valeric acid, thiopropionic acid, ricinoleic acid, benzene sulfonic acid, toluene sulfonic acid, naphthalene sulfonic acid, benzene sulfinic acid and naphthalene sulfinic acid.

As phenols are useful phenol, resorcin, hydroquinone, pyrogallol, chloroglucin, oxy-hydroquinone, inosite, 1-isopropyl-4-oxy-benzene, salicylic acid, naphthol, nitronaphthol and the corresponding thiophenols.

Enolizable carbonyl compounds are e.g. acetylacetone, acid-nitro compounds.

Imides are e.g. ditosyl imide and ditrichloraceticacidimide.

By using alcohols, phenols, enolizable carbonyl compounds and imides as catalysts, dialkylalminium halides and aluminiumsesquihalides are to be preferred.

Such compounds are introduced in concentrations from 0.01 to 1 mol, preferably from 0.02 to 0.6 mol of active hydrogen per mol of the metalloorganic catalyst component.

Low molecular weight fatty acids such as formic acid and acetic acid are preferred because they can be readily separated completely from the polymer solution and the polymer in the working up of the polymer solution. The molecular weight of the polymer increases with increasing amounts of acid. Formic acid suitably is used in a concentration from 0.001 to 1%, preferably from 0.05 to 0.6% based upon the weight of the metalloorganic catalyst component. The effect of the fatty acids on the Mooney index gradually decreases as one goes from formic acid to the higher fatty acids and finally reaches a constant value.

The active hydrogen containing compound, dissolved if expedient in a solvent such as benzene or preferably the solvent or solvent mixture used for the polymerization reaction mixture is introduced into the polymer solution at the end or near the end of the polymerization, that is at a monomer conversion of from about 30 to about 100%, preferably from 60 to 100%. The temperature of the polymer solution may be within the range from −50° C. to 100° C. and the active hydrogen containing compound suitably is added at the polymerization temperature. After a reaction time which may be up to 10 hours but suitably up to 10 minutes and preferably up to one minute the reaction mixture is worked up in known manner by destruction of the catalyst with an alcohol or ketone and precipitation of the polymer with alcohol or expulsion of the solvent with steam.

The invention is illustrated by the following specific examples.

EXAMPLE 1

A solution of 100 parts by weight of butadiene-1,3 in 625 parts by weight of benzene containing 42 p.p.m. of water and a catalyst composed of 1.25 parts by weight of diethylaluminiumchloride, 0.0175 parts by weight of cobalt octoate and 0.26 parts by weight of butadiene-1,2 was heated at 25° C. for 200 minutes. The Mooney viscosity of the polymer at thi spoint was ML–4=2 and the conversion 90%. A benzol solution of 0.0475 parts by weight of formic acid was added. After 5 minutes the polymer had a Mooney viscosity of ML–4=50. The catalyst was then decomposed by the addition of methanol and the polymer was recovered by expulsion of the solvent with steam.

EXAMPLE 2

The polymerization was carried out as described in Example 1. Then acetic acid was added. The following table shows the dependence of the MI–4 increase upon the amount of acetic acid added. In the table the amount of acetic acid is given in moles of acetic acid per mol of diethylaluminiumchloride.

| Acetic acid | Initial ML–4 | Final ML–4 |
|---|---|---|
| 0.1 | 50 | 60 |
| 0.25 | 47 | 62 |
| 0.3 | 52 | 75 |
| 0.35 | 50 | 75 |
| 0.35 | 30 | 50 |
| 0.5 | 50 | 60 |

EXAMPLE 3

By using nitric acid instead of formic acid according to Example 1, similar results are obtained.

EXAMPLE 4

By using sulfuric acid instead of formic acid according to Example 1, similar results are obtained.

EXAMPLE 5

By using oleic acid instead of formic acid according to Example 1, similar results are obtained.

EXAMPLE 6

By using amino valeric acid instead of formic acid according to Example 1, similar results are obtained.

EXAMPLE 7

By using benzene sulfonic acid instead of formic acid according to Example 1, similar results are obtained.

EXAMPLE 8

The polymerization is carried out according to Example 1 except diethylaluminiumchloride being exchanged by ethylaluminiumsesquichloride and the water contents ranging between 20 to 30 p.p.m. By using phenol intead of formic acid similar results are obtained.

EXAMPLE 9

By using salicylic acid instead of phenol according to Example 8, similar results are obtained.

EXAMPLE 10

The polymerization is carried out according to Example 1 except diethylaluminiumchloride being exchanged by ethylalumuminiumdichloride and the water contents being less then 20 p.p.m. By using ethanol instead of formic acid similar results are obtained.

EXAMPLE 11

By using benzylalcohol instead of ethanol according to Example 10, similar results are obtained.

EXAMPLE 12

By using propylenglycol instead of ethanol according to Example 10, similar results are obtained.

EXAMPLE 13

By using diethanolamine instead of ethanol according to Example 10, similar results are obtained.

EXAMPLE 14

By using acetylacetone instead of ethanol according to Example 10, similar results are obtained.

EXAMPLE 15

By using ditosylimide instead of ethanol according to Example 10, similar results are obtained.

We claim:
In a process for the production of 1,4-cis-polybutadiene comprising polymerizing 1,3-butadiene in an organic solvent containing a mixed catalyst composed of a compound of a metal of group VIII of the periodic system of Mendeleeff and a halogen containing metalloorganic compound of a metal of groups II and III of the periodic system of Mendeleeff at a temperature within the range from −50° C. to 100° C. and in the presence of water and butadiene-1,2, deactivating the catalyst and isolating the polymers from the reaction mixture, the step which consists in adding to the polymerization mixture only after a monomer conversion of at least 30% but prior to said catalyst deactivation from 0.01 to 1 mol, calculated upon the metalloorganic component of the catalyst of an active hydrogen containing compound selected from the group consisting of water, methanol, ethanol, isopropanol, t-butanol, benzylalcohol, triphenylcarbinol, naphthylethylcarbinol, glycol, propyleneglycol, nonandiol, glycerin, allylalcohol, 2-butindiol-1,3-, ethanolamine, diethanolamine, triethanolamine, trichloroethanol, methyl and ethylmercaptan and their homologues, nitric-, ntrosic-, sulfuric-, sulfurosic-, phosphoric-, phosphorosic-, perchloric- and trinitric-hydrogen-acids, formic acid, acetic acid, propionic acid, stearic acid, oleic acid, trichloracetic acid, linoleic acid, propargylic acid, phenylacetic acid, naphthalic acid, cinnamic acid, adipic acid, azelaic acid, phthalic acid, acetylene dicarboxylic acid, tricarballylic acid, methacrylic acid, crotonic acid, vinylacetic acid, lactic acid, citric acid, aminoacetic acid, amino valeric acid, thiopropionic acid, ricinoleic acid, benzene sulfonic acid, toluol sulfonic acid, naphthalene sulfonic acid, benzene sulfinic acid, naphthalene sulfinic acid, phenol, resorcin, hydroquinone, pyrogallol, chloroglucin, oxy-hydroquinone, inosite, 1-isopropyl-4-oxy-benzene, salicylic acid, naphthol, nitronaphthol and the corresponding thiophenols, acetylacetone, ditosyl imide and ditrichloroacetic acid-imide.

(References on following page)

References Cited

UNITED STATES PATENTS

| | | | |
|---|---|---|---|
| 2,977,349 | 3/1961 | Brockway et al. | 260—94.3 |
| 3,066,127 | 11/1962 | Carlson et al. | 260—94.3 |
| 3,086,000 | 4/1963 | Wargotz | 260—94.3 |
| 3,111,510 | 11/1963 | Balas | 260—94.3 |
| 3,161,628 | 12/1964 | Dost et al. | 260—94.9 |

FOREIGN PATENTS

| | | |
|---|---|---|
| 240,277 | 8/1960 | Australia. |
| 242,747 | 9/1962 | Australia. |
| 905,001 | 9/1962 | Great Britain. |

OTHER REFERENCES

Gippin, I and EC Product Research and Development, vol. 1, No. 1, March 1962, pages 32–39.

JOSEPH L. SCHOFER, *Primary Examiner.*

JAMES A. SEIDLECK, *Examiner.*

E. J. SMITH, *Assistant Examiner.*